Patented Jan. 10, 1928.

1,656,066

UNITED STATES PATENT OFFICE.

WILLIAM F. HENDRY, OF OSSINING, NEW YORK, AND VICTOR YNGVE, OF SOUTH ORANGE, NEW JERSEY, ASSIGNORS, BY MESNE ASSIGNMENTS, TO NATIONAL CARBON COMPANY INC., OF NEW YORK, N. Y., A CORPORATION OF NEW YORK.

DRY CELL.

No Drawing.   Application filed January 23, 1924.   Serial No. 688,056.

The present invention relates to dry cells and particularly to dry cells of that type in which a carbonaceous material mixed with a solid depolarizer is provided around a carbon electrode centrally located within a zinc container.

It is well known in the art that the use of very finely divided graphite or other carbonaceous material has certain advantages. The use of lamp black and so-called impalpable graphite has been suggested for this purpose (see Patent No. 1,162,449 to C. F. Burgess). However, the use of such impalpable graphite has certain drawbacks, since such material contains a large percentage of impurities which not only take up valuable space in the cell but also tend to shorten the shelf life of the cell and increase its internal resistance. It is not uncommon for such impurities to constitute 10% of the total weight of the graphite used.

In accordance with the present invention such objectionable impurities may be removed by a suitable treatment whereby the amount of inert material in the cell is decreased and the shelf life of the cell is increased.

To illustrate the manner in which such impurities may be removed, we shall now describe a treatment embodying the various features of the process of preparing impalpable graphite for use in a depolarizing mixture:

The graphite is treated with hydrochloric acid of 10% strength for several hours, though the action may be materially shortened by heating the solution. Whereas the graphite originally contains 9.6% ash, the treated graphite contains only 5.75% ash. Much of the removed material is iron whose detrimental effect on the dry cell is well known.

The graphite is then treated with a normal sodium hydroxid solution whereby the ash is further reduced to 4.18%.

We have also used hydrochloric acid of other concentrations with equally good results and have found that instead of hydrochloric acid, sulphuric acid or nitric acid may be substituted. We have also found that oxidizing agents may be used with these acids. For instance, any soluble permanganate, chlorate or nitrate or similar oxidizing agent may be used to assist the action. The treatment with alkali may be made with alkali of different strength or by substituting potassium hydroxid for the sodium hydroxid.

What we claim is:

1. A method of preparing impalpable graphite for depolarizing mixtures which comprises treating such impalpable graphite with an acid that forms soluble salts of the calcium group and then with a solution containing an alkali.

2. A method of preparing impalpable graphite for use in depolarizing mixtures, which comprises treating such graphite with hydrochloric acid of 10% strength for several hours, and then treating such graphite with a normal sodium hydroxid solution.

3. The method of preparing graphite for depolarizing mixtures which consists in first treating it with an acid in the presence of an oxidizing agent and then with an alkali.

4. The method of preparing impalpable graphite for depolarizing mixtures which consists in first treating it with dilute hydrochloric acid in the presence of any soluble permanganate, and then treating it with a normal sodium hydroxid solution.

In witness whereof, we hereunto subscribe our names this 18th day of January, 1924.

WILLIAM F. HENDRY.
VICTOR YNGVE.